H. Y. KRAUSS.
Endless-Chain Horse-Power.

No. 224,445. Patented Feb. 10, 1880.

WITNESSES:
Francis McArdle.
C. Sedgwick

INVENTOR:
H. Y. Krauss
BY Munn & Co
ATTORNEYS.

UNITED STATES PATENT OFFICE.

HARRISON Y. KRAUSS, OF KRAUSSDALE, PENNSYLVANIA.

ENDLESS-CHAIN HORSE-POWER.

SPECIFICATION forming part of Letters Patent No. 224,445, dated February 10, 1880.

Application filed December 3, 1879.

*To all whom it may concern:*

Be it known that I, HARRISON Y. KRAUSS, of Kraussdale, in the county of Lehigh and State of Pennsylvania, have invented a new and useful Improvement in Endless-Chain Horse-Powers, of which the following is a specification.

Figure 1:
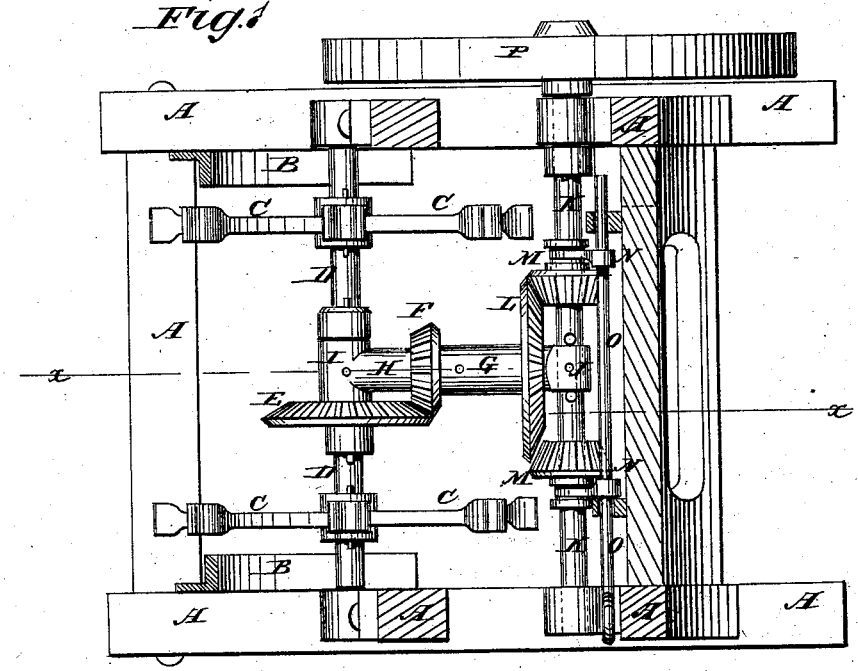
Figure 2:
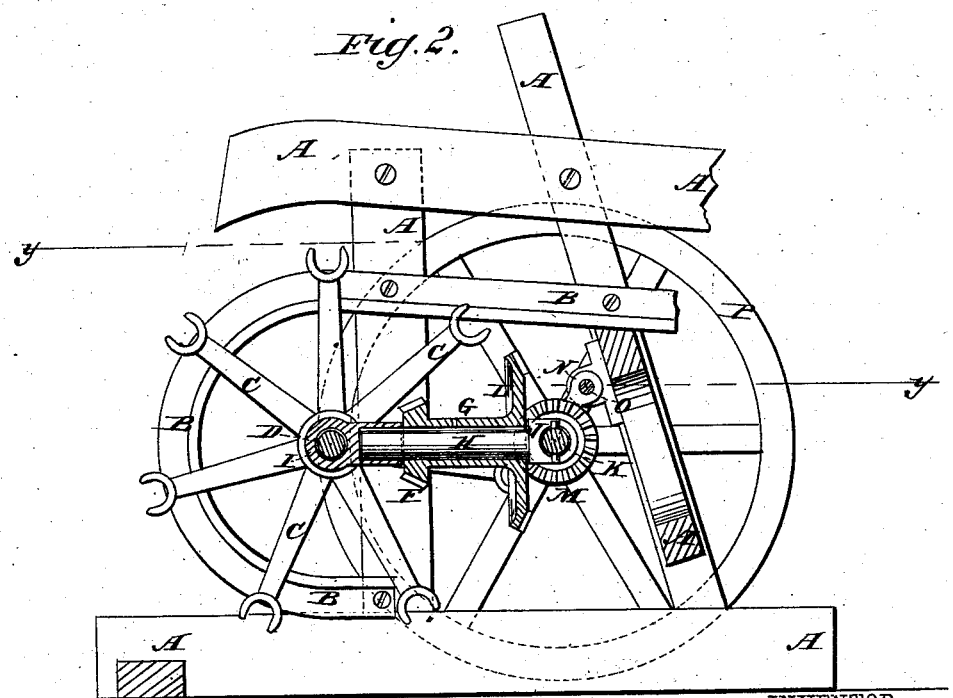

Figure 1 is a sectional plan view of my improvement, taken through the broken line $y\ y$, Fig. 2. Fig. 2 is a sectional side elevation taken through the broken line $x\ x$, Fig. 1.

The object of this invention is to furnish endless-chain horse-powers so constructed that the belt-wheel may be run in either direction with equal facility.

The invention consists in the combination, with the shaft that carries the sprocket-wheels and the shaft that carries the belt-wheel, of a set of gearing constructed to run the belt-wheel in either direction; and also in combining with the shafts and gearing devices for supporting and shifting the gearing, as will be hereinafter fully described.

Similar letters of reference indicate corresponding parts.

A represents the frame-work of the horse-power, and B the track that supports the endless-chain platform upon which the horses walk. C are the sprocket or chain wheels, which engage with and receive motion from the endless chains. The sprocket-wheels C are keyed or otherwise secured to a shaft, D, which revolves in bearings attached to the frame A in such a position that the sprocket-wheels will engage with the endless chains as they are passing around the curve at the end of the frame A.

To the shaft D is keyed or otherwise secured a large bevel-gear wheel, E, the teeth of which mesh into the teeth of a small bevel-gear wheel, F, attached to or formed upon the end of a tube or hollow shaft, G, placed upon the shaft H.

In one end of the shaft H is formed a bearing or eye, I, to receive the shaft D, and in its other end is formed a bearing or eye, J, to receive the counter-shaft K.

The eyes or bearings I J are secured in place upon the shafts D K by collars, pins, or other suitable means. Upon the other end of the tube or hollow shaft G is attached, or upon it is formed, a large bevel-gear wheel, L, into the teeth of which mesh the teeth of one or the other of the small bevel-gear wheels M, splined to the shaft K so that they may slide upon the said shaft K, but will carry it with them in their revolution.

The hubs of the bevel-gear wheels M have ring-grooves formed around their ends to receive the forked or notched ends of the arms N, attached at their other ends to the rod O at such a distance apart that when the teeth of one of the gear-wheels M is in gear with the teeth of the gear-wheel L the other gear-wheel M will be out of gear. The shifter-rod O slides in bearings attached to the frame A, so that it may be conveniently slid to throw one or the other of the gear-wheels M into gear with the gear-wheel L, as required.

To one end of the shaft K is attached the belt wheel or pulley P, which is made large and heavy, so as to serve as a fly-wheel for giving steadiness of motion to the machinery to be driven.

With this construction, by throwing one of the wheels M into gear with the gear-wheel L the belt-wheel P will be driven in one direction, and by throwing the other gear-wheel M into gear with the gear-wheel L the belt-wheel P will be driven in the other direction, so that the horse-power may be used for driving machinery geared to run in either direction without twisting the driving-belt.

Having thus fully described my invention, I claim as new and desire to secure by Letters Patent—

1. In an endless-chain horse-power, the combination, with the shaft D, that carries the sprocket-wheels C, and the shaft K, that carries the belt-wheel P, of the gear-wheel E, the connecting gear-wheels F L, and the sliding gear-wheels M M, substantially as herein shown and described, so that the belt-wheel P may be driven in either direction by the revolution of the sprocket-wheels C in the same direction, as set forth.

2. In an endless-chain horse-power, the combination, with the shaft D, that carries the sprocket-wheels C, and the shaft K, that carries the belt-wheel P, of the shaft H, provided with a bearing at each end, substantially as herein shown and described, for supporting the connecting gear-wheels F L from the shafts D K, as set forth.

HARRISON Y. KRAUSS.

Witnesses:
HORACE A. ROYER,
JAMES A. KRAUSS.